(12) United States Patent
Snediker

(10) Patent No.: US 7,510,145 B2
(45) Date of Patent: Mar. 31, 2009

(54) UAV RECOVERY SYSTEM II

(75) Inventor: John Snediker, Owings Mills, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 562 days.

(21) Appl. No.: 11/327,616

(22) Filed: Jan. 6, 2006

(65) Prior Publication Data

US 2007/0158498 A1 Jul. 12, 2007

(51) Int. Cl.
 *B64F 1/02* (2006.01)
(52) U.S. Cl. .................................. 244/110 F
(58) Field of Classification Search .............. 244/110 E, 244/110 F, 110 G, 110 R, 110 C; 294/2.1, 294/82.1, 82.14
See application file for complete search history.

(56) References Cited

U.S. PATENT DOCUMENTS

| | | | |
|---|---|---|---|
| 1,758,880 A | 5/1930 | Adams | |
| 2,435,197 A | 2/1948 | Brodie | |
| 2,481,454 A * | 9/1949 | Steele et al. ............ | 244/110 G |
| 2,488,050 A | 11/1949 | Brodie | |
| 2,501,997 A | 3/1950 | Doolittle | |
| 3,980,259 A | 9/1976 | Greenhalgh et al. | |
| 4,311,290 A | 1/1982 | Koper | |
| 4,790,497 A * | 12/1988 | Yoffe ......................... | 244/115 |
| 5,042,750 A | 8/1991 | Winter | |
| 6,824,102 B2 * | 11/2004 | Haggard .................. | 244/110 F |
| 7,143,976 B2 * | 12/2006 | Snediker et al. ......... | 244/110 G |
| 2005/0017129 A1 * | 1/2005 | McDonnell ............. | 244/110 G |

* cited by examiner

*Primary Examiner*—Tien Dinh
(74) *Attorney, Agent, or Firm*—DeMont & Breyer LLC

(57) ABSTRACT

A UAV recovery system is disclosed. In the illustrative embodiment for UAV recovery over water, the system includes ship-based elements and UAV-based elements. The UAV-based elements include a mass, such as ball, that is coupled to cord, which is in turn coupled to the tail of a UAV. The ship-based elements include a capture plate and a boom, wherein the boom is pivotably coupled to the deck of a ship. For use in recovery operations, the boom is rotated so that it extends over the side of the ship. A UAV is flown over the boom toward the capture plate at an altitude such that the mass that is attached to the tail of the UAV hangs lower than the capture plate. With continued forward motion, the cord that hangs from the UAV is captured by a grooves in the capture plate. The capture plate geometrically constrains the mass, thereby assuring positive capture of the UAV.

18 Claims, 6 Drawing Sheets

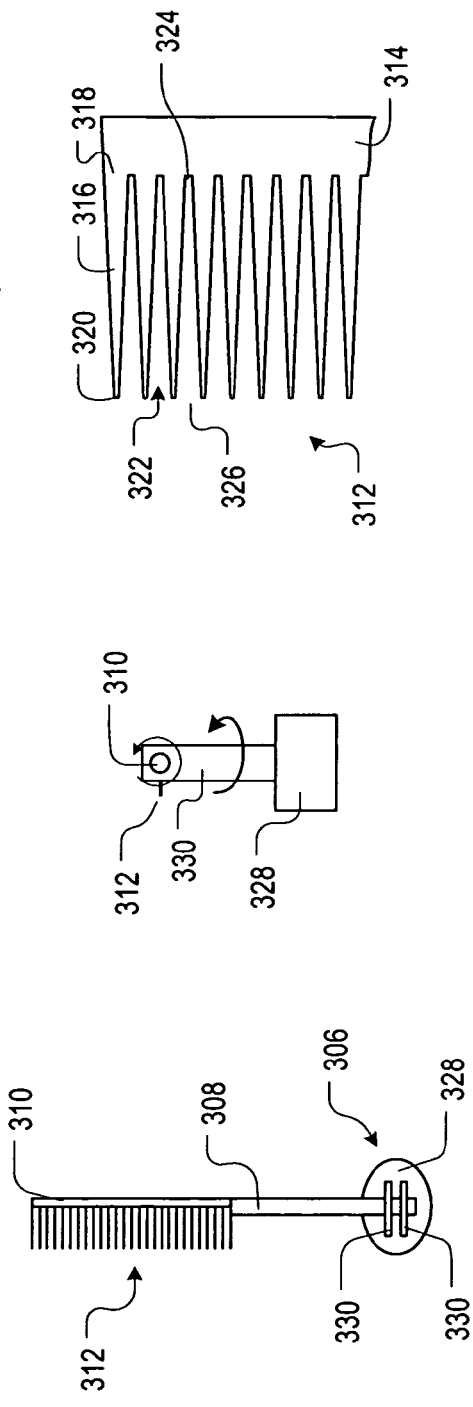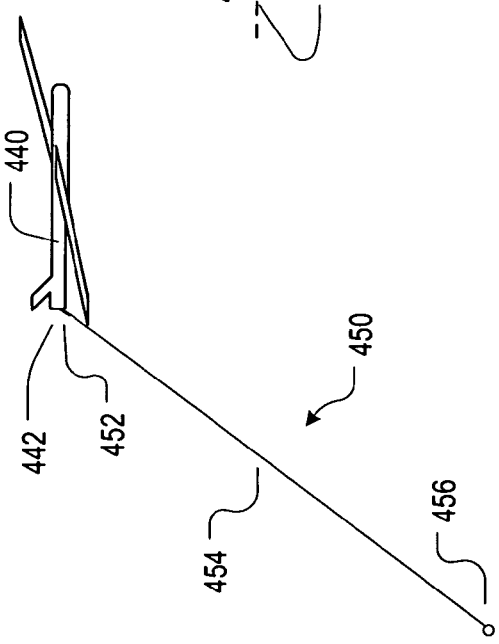

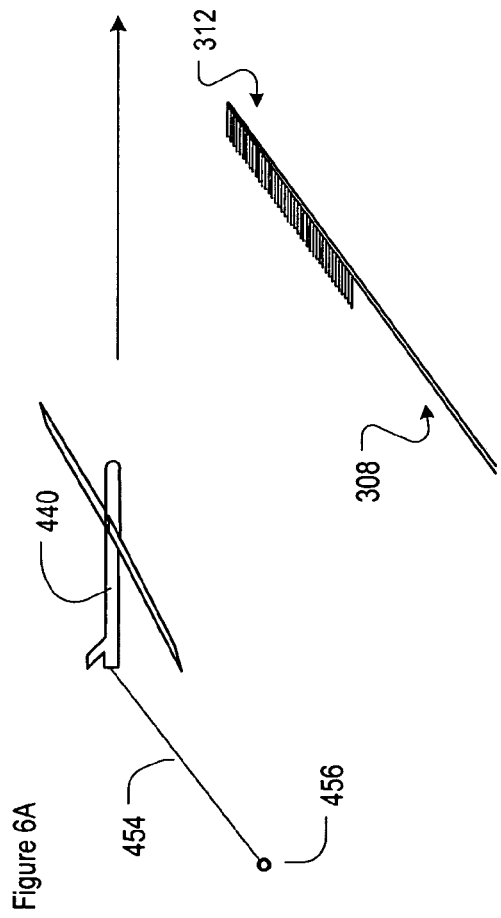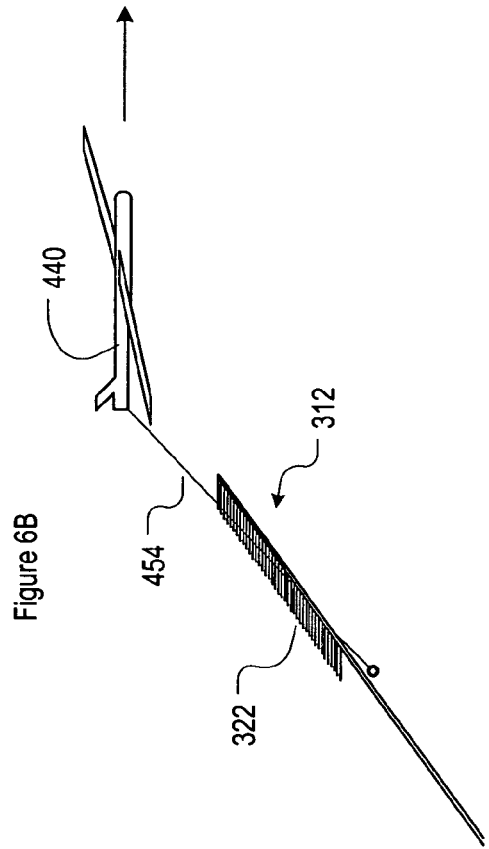

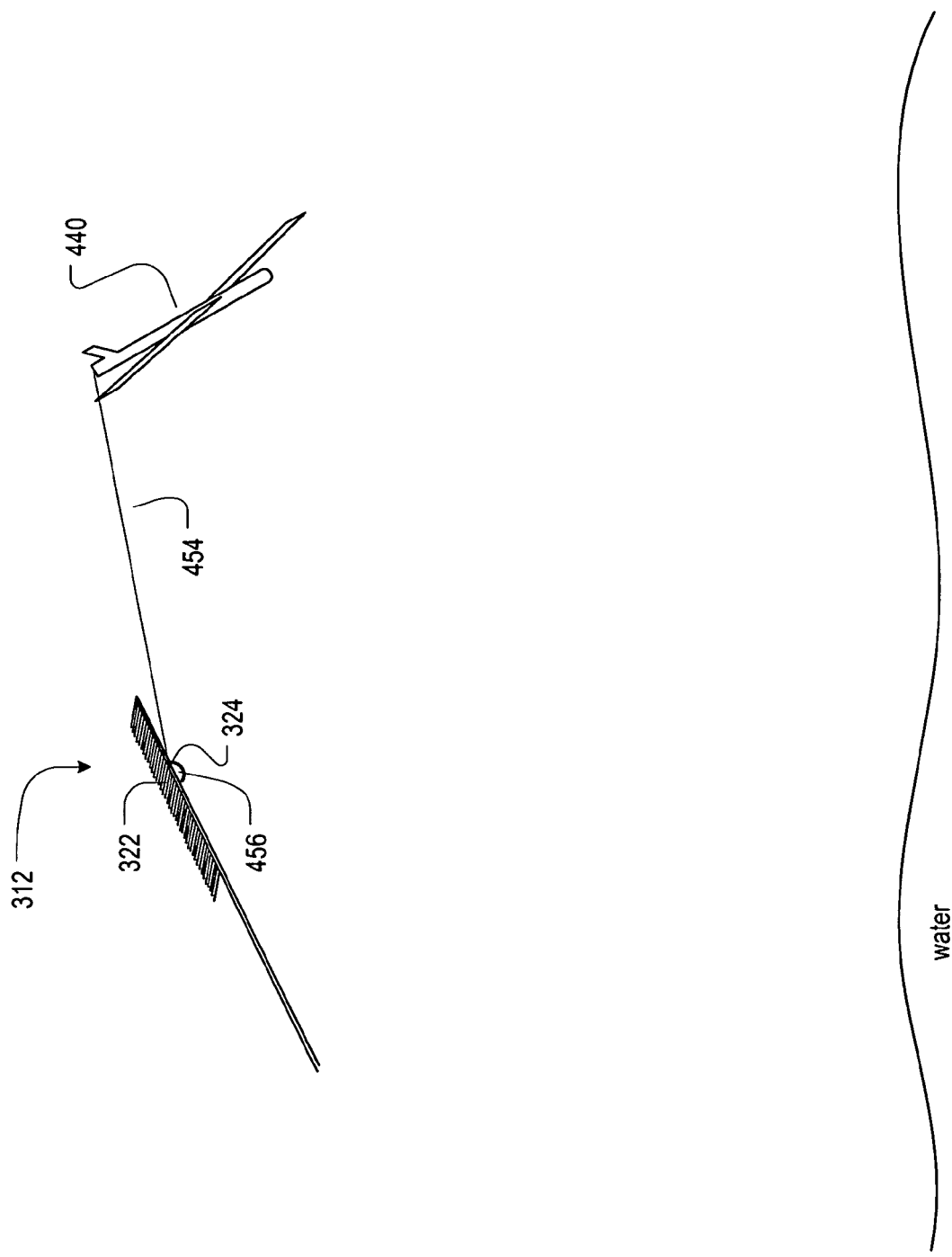

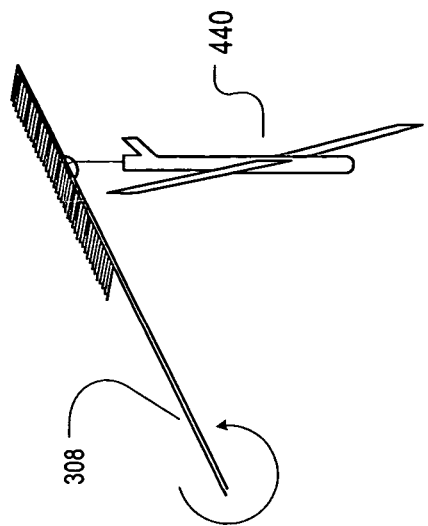
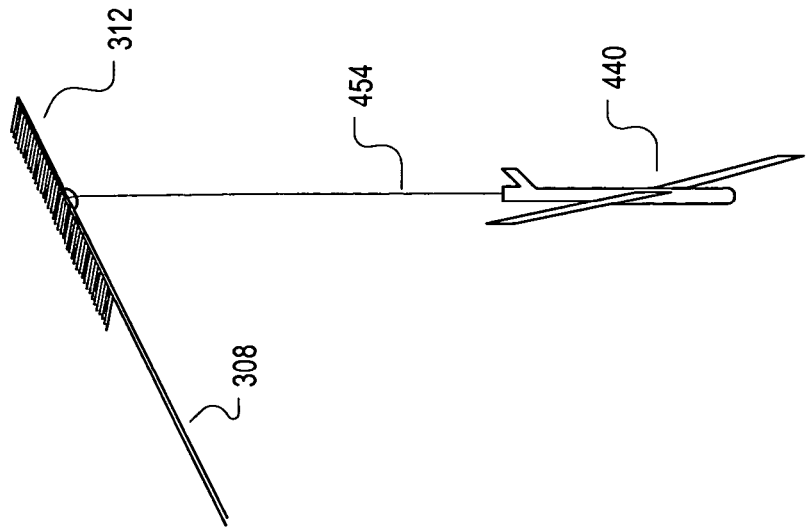

under which the boom has three degrees of freedom, are described in the accompanying detailed description and associated figures.

UAV RECOVERY SYSTEM II

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00014-03-C-0408 awarded by the U.S. Government.

FIELD OF THE INVENTION

The present invention relates to systems for retrieving unmanned aerial vehicles ("UAVs").

BACKGROUND OF THE INVENTION

The UAV is now widely used for reconnaissance. Characteristically small, inexpensive, and pilot-less (i.e., unmanned cockpit), the UAV is ideal for that purpose.

Notwithstanding its low cost, the UAV is not considered to be a disposable asset; recovery is at least attempted after each mission. Recovery is relatively straightforward when the UAV is operating over land. In such situations, the UAV is simply brought down on a makeshift landing field. Recovery is considerably more challenging, however, when the UAV is operating at sea. Due to the constant sway, roll, pitch, and yaw of a ship at sea, it is quite difficult to safely land a UAV on the deck of a ship. In fact, deck landings are rarely attempted.

One alternative to the deck landing is the water "landing," wherein a UAV is simply ditched in the sea. This technique has its own drawbacks, including a reasonable likelihood of damage to the UAV and some risk to the recovery crew.

A second alternative to a deck landing is to capture the UAV while it's still in flight. U.S. Pat. No. 4,753,400 discloses a ship-mounted apparatus for this purpose. The system disclosed in that patent includes a recovery net that is attached to a parachute. The net is also coupled, via a tow line, to a winch that is located on the deck of a ship. In use, the parachute floats the recovery net to a desired altitude for mid-air capture of the UAV. After capture, the recovery net and ensnared UAV are winched down to the deck.

The approach that is disclosed in U.S. Pat. No. 4,753,400 is not without drawbacks. In particular, one drawback is that the apparatus disadvantageously requires a substantial amount of deck area. A second drawback is that a relatively labor-intensive untangling operation is required to free the UAV from the net. Furthermore, the relatively abrupt stop of a UAV in the recovery net can damage its fragile wings.

As a consequence, there is a need for a UAV recovery system that requires little deck space, enables rapid re-use of a UAV after recovery, and is less likely to damage a UAV than traditional recovery techniques.

SUMMARY OF THE INVENTION

The present invention provides a recovery system for a UAV. In the illustrative embodiment of the invention, the recovery system is adapted for recovering UAVs over water. In other embodiments, the UAV recovery system can be configured for use on land.

A UAV recovery system in accordance with the present invention and adapted for recovery over water includes (1) ship-based elements and (2) UAV-based elements.

The ship-based elements include a capture plate and a boom. In the illustrative embodiment, the boom has two degrees of freedom of movement; it is capable of pivoting or swiveling about a support point (i.e., in the manner of a door) and is also able to rotate about its long axis (i.e., in the manner of a rotisserie). In the illustrative embodiment, the boom is coupled to the deck of a ship. When stowed, the boom overlies the deck of a ship. In some other embodiments, the boom has three degrees of freedom of movement. In such embodiments, in addition to the two degrees mentioned above, the boom is telescoping; that is, it collapses in the manner of an antenna for stowage.

The capture plate is coupled to the boom. In the illustrative embodiment, the capture plate includes a plurality of closely-spaced "teeth," like a hair comb. The spaced teeth form a plurality of narrow grooves. The fingers and the grooves are oriented orthogonally to the long axis of the boom (akin to the relative spatial orientation of the "spine" of a hair comb and the teeth that depend from it).

The individual teeth of the capture plate taper; in particular, they are relatively wider at their base than at their apex. As a consequence, the groove that is formed between adjacent fingers is v-shaped, being widest at its mouth (i.e., near the apex of adjacent fingers) and tapering to a pinch point at the base of the adjacent fingers.

The UAV-based elements include a mass, such as ball, that is coupled to a cord. The cord, in turn, is coupled to the tail of a UAV. The cord, or, alternatively, a lanyard by which the cord is attached to the UAV, is elastic, resilient, or otherwise shock-absorbing.

For use in recovery operations, the boom is rotated from its stowed position to an active position in which it extends over the side of the ship. To recover a UAV, the UAV is flown over the boom such that its direction of flight is substantially orthogonal to the boom and facing the mouth of the grooves in the capture plate. The UAV is flown at an altitude such that mass that is attached to the tail of the UAV is lower than the capture plate. With continued forward motion, the cord that hangs from the UAV is captured by one of the grooves in the capture plate. The UAV continues along a substantially level flight path until the mass/cord is seized at the pinch point of the groove. Since the mass is larger than the groove that is formed between adjacent teeth in the capture plate, a "geometrical" lock results, thereby assuring positive capture of the UAV.

When the mass locks at the pinch point of the groove, the elastic/resilient cord or lanyard is placed in tension and stretched by the continued forward motion of the UAV. Stretching against tension, the cord/lanyard absorbs the energy of the in-flight UAV. Since the cord is attached to the tail of the UAV, the motion of the UAV during deceleration is quasi-linear. When the UAV decelerates to a velocity at which flight can no longer be sustained, it falls, swinging beneath the boom. The cord is appropriately sized to prevent contact between the UAV and the boom and or the UAV and the underlying water.

The boom is rotated about its long axis to "reel-in" the hanging UAV. After the UAV is reeled in sufficiently to clear the deck, the boom is swiveled back to its original position above the deck of the ship for final retrieval and disengagement of the UAV.

These and other features of a UAV recovery system in accordance with the illustrative embodiment, and variations thereof, are described further in the Detailed Description below and depicted in the accompanying Drawings.

BRIEF DESCRIPTION OF THE DRAWINGS

FIG. 3 depicts further detail of the ship-based elements of a UAV recovery system in accordance with the illustrative embodiment of the present invention.

FIGS. 4A-4C depict detail of the UAV-based elements of a UAV recovery system in accordance with the illustrative embodiment of the present invention.

FIGS. 6A-6E depict the manner in which the capture plate snares the cord and mass that hang from the UAV.

DETAILED DESCRIPTION

Figure 1:
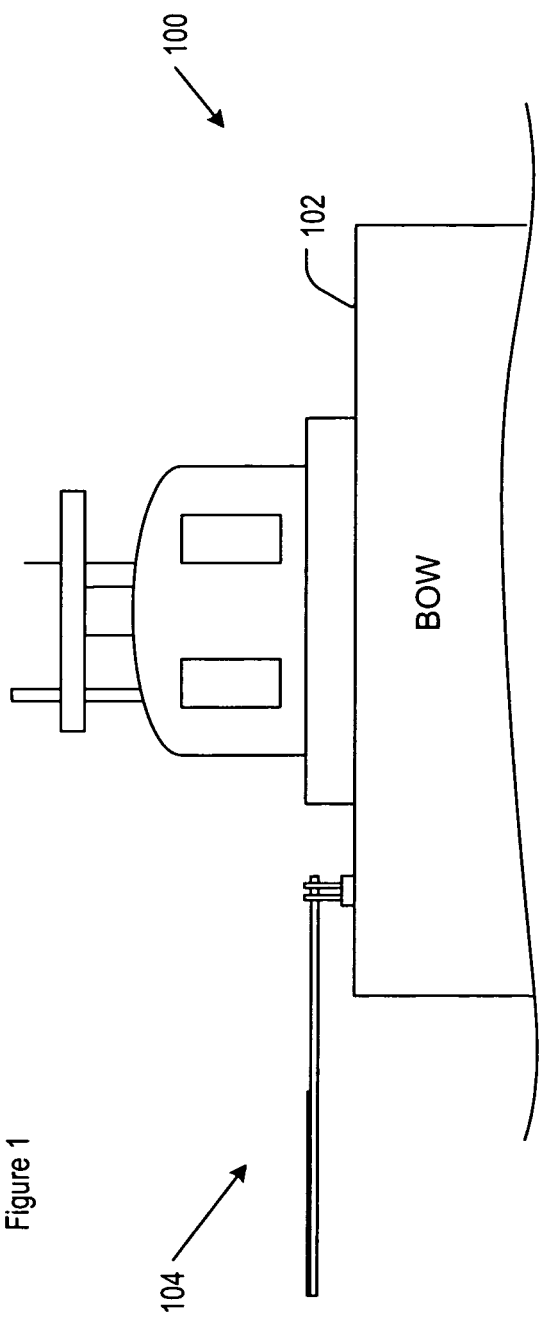
FIG. 1 depicts a bow-end view of a ship that incorporates elements of a UAV recovery system in accordance with the illustrative embodiment of the present invention.
Figure 2:
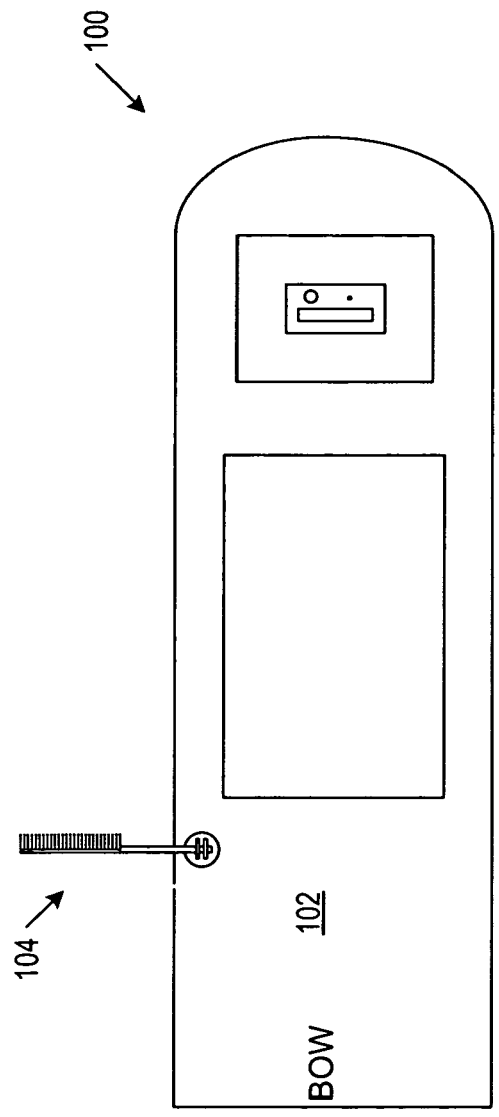
FIG. 2 depicts a top view of the ship of FIG. 1.

FIGS. 1 and 2 depict, via respective bow and top views, ship 100. Coupled to deck 102 of the ship are ship-based elements 104 of a UAV recovery system in accordance with the illustrative embodiment of the present invention.

FIGS. 3A through 3C depict further detail of ship-based elements 104 of the UAV recovery system. Referring now to FIGS. 3A, ship-based elements 104 include support structure 306, movable boom 308, and capture plate 312, which are mechanically interrelated as shown. In the embodiment depicted in FIGS. 3A and 3B, support structure 306 comprises base 328 and upright member(s) 330. In some embodiments, support structure 306 is disposed on an ISO module (not depicted).

Support structure 306 supports boom 308. As depicted by the arrows in FIG. 3B, the boom is supported in such a way that it has two degrees of freedom. In particular, boom 308 is capable of being rotated about its horizontal long axis (the long axis is directed "into the page" in FIG. 3B) and it also pivots about a vertical axis that aligns with upright members 330.

The rotational and pivoting movement of boom 308 can be actuated by motors or manually, depending upon configuration. For embodiments that utilize manual actuation, to rotate boom 308 about its long axis, a hand crank (not depicted) can be coupled to the end of the boom. To manually pivot boom 308, force can be applied directly against the side of boom. In embodiments that utilize automatic actuation, motors are appropriately coupled to boom 308 and base 328 (or upright members 330). Those skilled in the art will know how to configure support structure 306 and boom 308 for either case. This capability to rotate the boom about these two different axes is described in more detail later in this specification.

Capture plate 312 is attached to boom 308 and extends to distal end 310 of the boom. In the illustrative embodiment, capture plate 312 is disposed on top of boom 308 (see, e.g., FIG. 1). In some alternative embodiments (not depicted), capture plate 312 is simply an extension of boom 308; that is, capture plate 312 begins where boom 308 ends.

FIG. 3C depicts further detail of comb-like capture plate 312. The capture plate includes a plurality of teeth 316, which depend from spine region 314. The teeth are oriented orthogonally to the long axis of spine 314. Adjacent teeth 316 are spaced apart from one another, such that groove 322 is defined between.

Teeth 316 are wider at base 318, where the teeth meet spine 314, than at apex 320. As a consequence, groove 322 is v-shaped, tapering inward from a widest point at mouth 326 to pinch point 324.

As described in more detail later in this specification, in operation, one of grooves 322 capture a cord that hangs from a UAV. As a consequence, mouth 326 of grooves 322 must be wide enough to readily accept the cord. Since the diameter of the cord will typically be about ⅜ to ½ inch, the mouth will be about ½ to ¾ inch. The edges of teeth 316 should be rounded or smoothed to avoid fraying the cord.

For use at sea, ship-based elements 104 of the UAV recovery system are advantageously formed from a material(s) that is resistant to corrosion. Furthermore, since most UAVs are relatively lightweight and will have a relatively low net forward velocity at capture (about 20 knots), ship-based elements 104 can be formed from lightweight materials. For example, and without limitation, suitable materials of construction for support and capture elements (e.g., boom 308, capture plate 312, etc.) include composite materials and aluminum. It will be clear to those skilled in the art, after reading this specification, which materials are suitable for ship-based elements 104.

For most applications, capture plate 312 will be between about twelve to twenty feet in length, although it can be shorter or longer, as is appropriate for the size of the UAV and as is appropriate for the size of the ship with which the UAV recovery system is used.

FIGS. 4A through 4C depict UAV-based elements 450 of a UAV recovery system in accordance with the illustrative embodiment of the present invention. UAV-based element 450 include lanyard 452, cord 454, and mass 456.

As depicted in FIG. 4A, UAV-based elements 450 are coupled to tail 442 of UAV 440. More particularly, in the illustrative embodiment, lanyard 452 attaches to tail 442, and cord 454 is attached to lanyard 452, as depicted in FIG. 4B. Lanyard 452 is attached to tail 442 near center of gravity axis A-A. In some embodiments, cord 454 is attached directly to tail 442 such that lanyard 452 is not used.

At least one of either lanyard 452 and cord 454 are elastic, resilient, or otherwise adapted to absorb shock and energy. The reason for this is discussed later in conjunction with FIGS. 6A through 6E. As an alternative to using a material to provide shock- and energy-absorbing capability, any of a variety of mechanical arrangements can be used to impart this property. For example, in some embodiments, cord 454 is coupled to tail 442 of UAV 440 by a spring or spring-like mechanism.

With reference now to FIG. 4C, mass 456, which in the illustrative embodiment is a sphere, is attached to the free end of cord 454. The mass functions as a "stop" that prevents a cord that has engaged a groove in capture plate 312 from slipping fully through the groove. To function adequately for this purpose, mass 456 must have a size and shape that ensures that it will not slip through grooves 322. A semi-rigid sphere having a diameter of about 1 to 1½ inches is suitable for this purpose. Pyramidal-shaped masses, cubic-shaped masses, and other shapes would likewise be suitable.

In some embodiments, cord 454 and mass 456 remain deployed during UAV operations. This avoids the complications that are typically associated with deployment systems (e.g., tail hook deployment systems, etc.). Since flight operations might be affected by a permanently deployed cord 454 and mass 456, in some embodiments, the cord and mass are stowed beneath the body of the UAV in semi-coiled form and then released remotely at an appropriate time before a capture attempt.

Figure 5C:
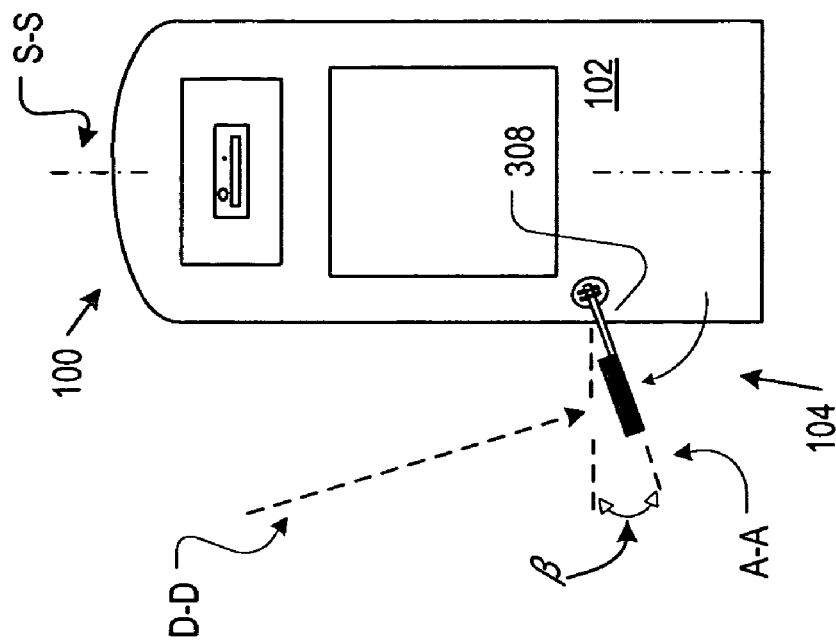
FIGS. 5A-5C depict various positions of the boom of the illustrative UAV recovery system.
Figure 5B:
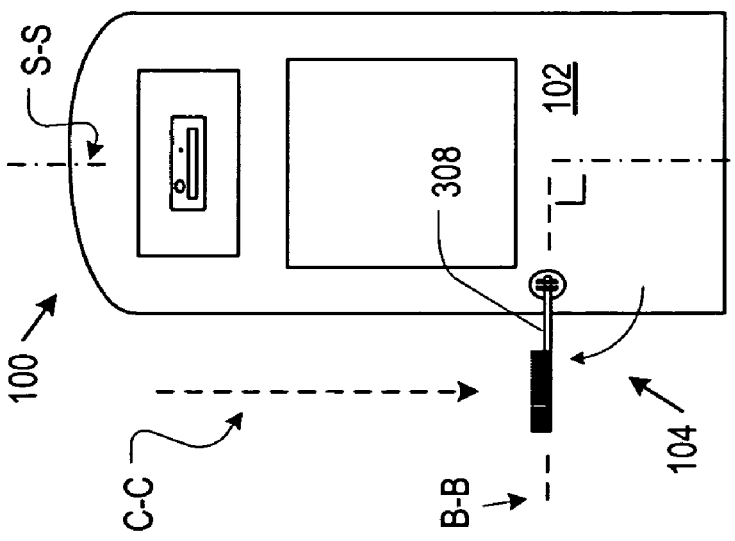
Figure 5A:
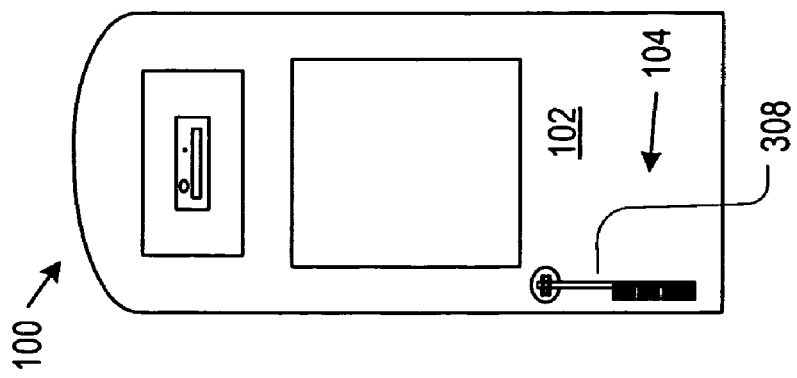

FIGS. 5A through 5C and 6A through 6E depict the illustrative UAV recovery system in operation. More particularly, FIGS. 5A through 5C depict re-positioning of boom 308 from a stowed position to two different recovery positions. FIGS. 6A through 6E depict the approach and airborne capture of a UAV using a UAV recovery system in accordance with the present invention.

Turning now to FIG. 5A, ship-based elements 104 of the illustrative UAV recovery system are depicted in a stowed position, wherein boom 308 is positioned above deck 102 (i.e., not over the side of the deck). In preparation for recovery of a UAV, boom 308 is moved from the stowed positioned to a recovery position, such as to the positions depicted in FIGS. 4B and 4C. Boom 308 can be pivoted manually or via a motorized system.

In the recovery position that is depicted in FIG. 5B, axis B-B of boom 308 is substantially orthogonal to the long axis of S-S of ship 100. Furthermore, flight path C-C of a UAV on approach to the UAV recovery system is substantially parallel to axis S-S of ship 100.

In a second recovery position that is depicted in FIG. 5C, axis A-A of boom 316 is not orthogonal to axis S-S; rather, it is positioned at some offset from perpendicular, as measured by angle β. The purpose for orientating boom 308 at an offset, as depicted in FIG. 5C, is to bring the UAV along flight path D-D that is not parallel to axis S-S of ship 100. The reason for this is that if control of a UAV is lost on its approach to the ship, there is a reduced likelihood of crashing on the deck if the UAV follows flight path D-D as opposed to flight path C-C. In some embodiments, angle β is 14.1 degrees, which is the approach angle that is used for landing aircraft on aircraft carriers.

Regarding FIGS. 6A through 6E, it is to be understood that boom 308 is placed in a desired recovery position (e.g., see FIGS. 5B and 5C) to receive UAV 440. For clarity of illustration, neither support structure 306 nor ship 100 is depicted in FIGS. 6A-6E.

FIG. 6A depicts UAV 440 on approach to boom 308 and capture plate 312. Mass 456 dangles from cord 454 off the tail of UAV 440. In some embodiments, UAV 440 is remotely controlled by a pilot that is stationed on the deck of the ship (not depicted). In some other embodiments, UAV 440 is either partially or fully autonomously controlled via various video and electronic systems. For autonomous control, a video camera and a transmitter, which can be mounted on boom 308, transmit a video signal to a processor that is located aboard ship. In some embodiments, the processor runs automated target recognition and automated target tracking software and receives altimeter information that is transmitted from UAV 440 by way of a transceiver. Additionally, the processor receives data about the ship's movement (e.g., speed, heading, etc.), such as from an inertial measurement unit ("IMU") and other data that enables the processor to precisely determine the position (including height) of capture plate 312 and of UAV 440.

The transceiver transmits commands that originate from either (1) the remotely-located pilot or (2) the processor. Those commands cause UAV 440 to fly towards capture plate 312. As depicted in FIG. 6B, cord 454 is snagged within one of grooves 322 of capture plate 312. Since little drag is associated with the initial capture, UAV 440 continues flying along a substantially level course.

Referring now to FIG. 6C, within moments after its initial capture, UAV 440 will have dragged cord 454 through groove 322 to the extent that mass 456, which is located at the end of the cord, is jammed against the underside of capture plate 312 at the pinch point of the groove. Since mass 456 is too large to fit through groove 322, and since pinch point 324 resists any further forward motion of the mass or cord 454, capture plate 312 provides positive capture of UAV 440.

After positive capture, UAV 440 continues forward very briefly since cord 454 or lanyard 452 (or both) are elastic/resilient, etc. The cord/lanyard is stretched by the in-flight UAV. Stretching the cord/lanyard absorbs energy from the in-flight UAV, thereby decelerating it. Since cord 454 is attached to the tail of the UAV, the motion of UAV will be quasi linear during deceleration. When the UAV decelerates to the point at which flight cannot be sustained, it begins to fall.

The allowable deceleration rate is dependent upon the fragility of the payload electronics, the height above water level of the system, and the mass of UAV 440, among other factors.

Regarding shock absorption during deceleration, in some embodiments, lanyard 452 is similar to "fall protection" lanyards (stitched strapping). This would absorb the energy of the UAV during deceleration, yet prevent a recoil effect that would be observed when using a bungee cord.

Due to pendulum/pendular motion of the "mass on cord," it is possible for mass 456 to wrap around capture plate 312 and then unwrap as the UAV travels past the capture plate. As it unwraps, mass 456 might exit out of the same groove 322 in which it entered. To prevent this from occurring, one or more of the following approaches can be taken:

- Situate a catch at pinch point 324 or mouth 326 of grooves 322, wherein the catch seizes cord 454 upon entry into the groove.
- Use an appropriate cord length and tooth design such that the worst case "wrap" prohibits mass 456 from unwrapping out of groove 322 due to a reduced effective cord length (i.e., UAV 440 has traveled forward and the pendulum length of the cord is shortening).
- Use four capture plates 312, which are oriented at 90 degrees with respect to each other about the circumference of boom 308. This would enable a shorter teeth 316 to be used for the capture plates while increasing the points at which mass 456 will positively engage pinch point 324 of a groove 322.

FIG. 6D depicts UAV 440 at rest, hanging from capture plate 312. Cord 454 is sized so that UAV 440 will not contact the underlying water. Before boom 308 is pivoted back above the deck of the ship, the UAV must be drawn toward the boom (so that it can clear the side of the ship). In the illustrative embodiment, this is done by rotating the boom about its long axis, as depicted in FIG. 6E. This "reels in" UAV 440, such that cord 454 raps around capture plate 312, drawing the UAV toward the boom. Once UAV 440 is drawn sufficiently close to boom 308, the boom is pivoted back toward the ship so that the UAV is positioned above the deck for final retrieval.

A particularly advantageous feature of the capture system described herein is the ability for a UAV to maintain a safe altitude above the capture system on approach. The length of cord 454 can be set to accommodate any vertical dither inherent in the UAV's flight due to general or environmental performance characteristics. For example, if the UAV is known to vary a maximum of five feet in altitude from a desired flight path, then cord 454 is designed to accommodate this. That is, it should be at least about six feet long to ensure that collision with the boom does not occur.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiment of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
   a boom, wherein said boom has a fixed end and a free end;
   a capture plate, wherein said capture plate depends from said boom proximal to said free end, wherein said capture plate comprises a plurality of spaced-apart teeth, and wherein said spaced-apart teeth define a plurality of grooves; and
   a support structure, wherein said support structure supports said boom proximal to said fixed end and above an underlying surface, and wherein, in conjunction with said support structure, said boom possesses:
      a first rotational degree of freedom, wherein said first rotational degree of freedom enables said free end of said boom to pivot in a plane that is substantially parallel to said underlying surface; and
      a second rotational degree of freedom, wherein said second degree of freedom enables said boom to rotate about its longitudinal axis.

2. The apparatus of claim 1 wherein said underlying surface is a deck of a ship.

3. The apparatus of claim 2 wherein by virtue of said first rotational degree of freedom, said boom pivots between a first position in which its long axis is aligned with a long axis of said ship and a second position in which its long axis is orthogonal to said long axis of said ship.

4. The apparatus of claim 1 wherein said capture plate is disposed on said boom.

5. The apparatus of claim 1 wherein said capture plate is coupled to said free end of said boom.

6. The apparatus of claim 1 wherein said apparatus is a UAV recovery system, and wherein said apparatus further comprises:
   a mass, wherein said mass is physically adapted to be geometrically constrained by one of said grooves in said capture plate;
   a coupling, wherein said coupling couples said mass to a UAV, and wherein said coupling is physically adapted to absorb energy from said UAV when said coupling is placed in tension, and further wherein a portion of said coupling is physically adapted to be captured by said one groove in said capture plate.

7. The apparatus of claim 6 wherein said mass has a spherical shape.

8. The apparatus of claim 6 wherein said coupling comprises a cord.

9. The apparatus of claim 8 wherein said cord comprises a material having at least one property selected from the group consisting of elastic, resilient, and shock absorbing.

10. The apparatus of claim 8 wherein said coupling further comprises a lanyard, wherein said cord is coupled to said lanyard and said lanyard is coupled to said UAV.

11. The apparatus of claim 10 wherein at least one of said cord and said lanyard comprises a material having at least one property selected form the group consisting of elastic, resilient, and shock absorbing.

12. An apparatus comprising:
   a mass,
   a coupling, wherein said coupling couples said mass to a tail of a UAV, wherein
      said coupling is physically adapted to absorb energy from said UAV when said coupling is placed in tension; and a capture plate, wherein said capture plate depends from a boom, wherein said capture plate comprises a plurality of spaced-apart teeth that define a plurality of grooves, wherein
      said mass has a size and a shape that enables it to be geometrically constrained by the capture plate and wherein a portion of said coupling is physically adapted to be received by one of said grooves.

13. The apparatus of claim 12 wherein said mass has a spherical shape.

14. The apparatus of claim 12 wherein said coupling comprises a cord.

15. The apparatus of claim 14 wherein said cord comprises a material having at least one property selected from the group consisting of elastic, resilient, and shock absorbing.

16. The apparatus of claim 14 wherein said coupling further comprises a lanyard, wherein said cord is coupled to said lanyard and said lanyard is coupled to said UAV.

17. The apparatus of claim 16 wherein at least one of said cord and said lanyard comprises a material having at least one property selected form the group consisting of elastic, resilient, and shock absorbing.

18. The apparatus of claim 12 wherein said apparatus is a UAV recovery system, and wherein said apparatus further comprises:
   a support structure, wherein said support structure supports said boom above an underlying surface, and wherein, in conjunction with said support structure, said boom possesses:
      a first rotational degree of freedom, wherein said first rotational degree of freedom enables said a free end of said boom to pivot in a plane that is substantially parallel to said underlying surface; and
      a second rotational degree of freedom, wherein said second degree of freedom enables said boom to rotate about its longitudinal axis.

* * * * *